Sept. 30, 1958    M. KOULIKOVITCH    2,853,917
APPARATUS FOR PRECISELY MEASURING LENGTHS
Filed March 22, 1955
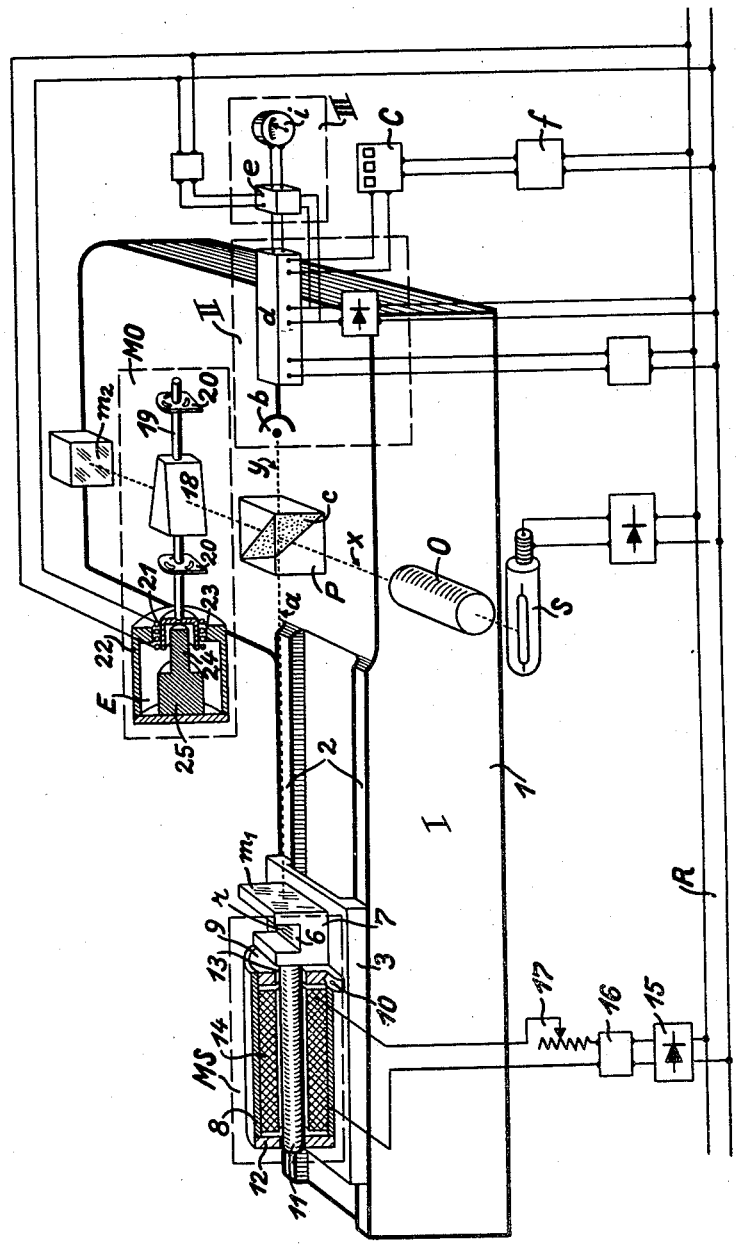
INVENTOR
MIRON KOULIKOVITCH
By Young, Emery & Thompson
ATTYS United States Patent Office 2,853,917
Patented Sept. 30, 1958

2,853,917

APPARATUS FOR PRECISELY MEASURING LENGTHS

Miron Koulikovitch, Geneva, Switzerland, assignor to Societe Genevoise d'Instruments de Physique, Geneva, Switzerland, a corporation of Switzerland Application March 22, 1955, Serial No. 495,883

Claims priority, application Switzerland March 30, 1954

5 Claims. (Cl. 88—14)

The present invention relates to an optical interferometer type apparatus for measuring lengths with great preciseness.

Known apparatus by which lengths can be measured with the greatest precision comprises:

(a) An interferometer, one of the mirrors of which is movable, (b) A photo-electric cell for receiving light from the interference fringes, (c) A modulator consisting of a grid driven with a periodic reciprocating movement perpendicular to the beam of rays impinging upon the photo-electric cell and disposed in front of the latter, so that a small movement of the interferometer mirror producing a displacement of the interference fringes therefore causes a proportional variation of the ratio of the successive times elapsing between two successive maxima or minima of the luminous intensity received by the photo-electric cell.

(d) An electronic system converting the variations of the current of the photo-electric cell into current impulses of very brief or momentary duration, (e) A measuring system controlled by the said current impulses and visibly indicating the variation of the ratio of the successive times elapsing between two successive maxima or minima of the luminous intensity received by the photo-electric cell. Consequently, this measuring system translates the inequality of the times elapsing between the momentary impulses emitted in the course of one complete cycle of the reciprocating movement of the grid, into a measure of the movement of the movable mirror in relation to a position chosen as origin.

Such apparatus is described in my U. S. application No. 354,009, filed May 11, 1953, and electronic and measuring systems are described in U. S. Patents No. 2,401,712 and No. 2,448,718 and in British Patents Nos. 684,435, 686,274. This type of apparatus and the devices associated therewith are therefore regarded as known, so that it is unnecessary to describe them in detail here.

However, the said apparatus has the disadvantage that the luminous intensities incident upon the photo-electric cell are weak, or that the contrasts between the successive maxima and minima of the luminous intensity are not very pronounced, so that the possibility of creating measurable interferences is limited to small "operating differences," so that the measurable length by which the movable mirror can be moved is limited.

The present invention tends to obviate the aforesaid disadvantage and thus to lengthen considerably the measurable travel of the mirror to be moved, by virtue of the fact that the arrangement hereinafter described has the best theoretically possible luminous output and produces the most marked contrasts between the minima and the maxima of light impinging upon the cell. The invention provides a method of precisely measuring lengths, wherein the distances moved by an object connected to one of the mirrors of an interferometer is defined by the measurement of the variation of the time elapsing between two successive maxima or minima of a luminous intensity which is periodically modulated by displacement of interference fringes, and received by a photo-electric cell, the mirrors of the interferometer being illuminated by monochromatic rays and the relative positions of the parts of the said interferometer being adjusted in such manner as to spread out the interference fringes to infinity and thereby to obtain a substantially uniform illumination of the fields observed, and the luminous intensity of the field of interference being modulated by a periodic variation of the optical path followed by the rays of at least one of the interfering beams of rays.

The invention has for its object to provide an apparatus for precisely measuring lengths comprising an interferometer and means for modulating the luminous intensity by displacement of interference fringes. The apparatus according to the invention differs from known apparatus in that the mirrors of the interferometer are so disposed in relation to one another and in relation to a source of monochromatic rays of constant luminous intensity as to obtain a substantially uniform illumination of the field observed, by spreading out to infinity the interference fringes, and in that the modulator is disposed in the path of at least one of the two beams of rays interfering with one another, and produces a periodic variation of the optical path followed by the rays of at least one of the two beams of rays interfering with one another.

The single figure of the accompanying drawing is a diagrammatic view in perspective of the parts of one apparatus according to the invention.

In the illustrated constructional form, the apparatus comprises:

(a) An interferometer I comprising a monochromatic light source S, an optical device O forming a beam of parallel rays, a beam-separating device P comprising a semi-reflecting surface $c$ forming an angle of 45° with the optical axis $x$ of the optical device O, and two mirrors $m_1$ and $m_2$, one of which is fixed, while the other is movable along the axis $a$ of the beam of rays reflected from the semi-reflecting surface $c$.

(b) An electronic system II comprising a photo-electric cell $b$ and an electronic device $d$ converting the variations of the current of the photo-electric cell into momentary electrical impulses.

(c) A measuring system III comprising a direct-current measuring instrument $i$ having high inertia and a device $e$ for reversing the direction of flow of the current, controlled by the current impulses emitted by the electronic system II.

These individual elements are known and have been described in detail in the aforesaid patents and patent application and they will not therefore be described in greater detail here.

The parts of the interferometer and the photo-electric cell $b$ are mounted on a frame 1 supporting a slideway 2. A carriage 3 supporting the movable mirror $m_1$ and a scale $r$ is displaceable along the said slideway alongside a divided rule of high precision (not shown). The said scale $r$ is engraved in a surface 6 perpendicular to the plane of the mirror $m_1$ and situated approximately in the longitudinal centre plane of the mirror $m_1$. The surface 6 and the mirror $m_1$ form part of a support 7 displaceable in relation to the carriage 3. The movements of the said support 7 are controlled by a magnetostrictive actuating device MS. This device comprises:

(a) A 60% nickel-steel cylinder 8, the axis of which is parallel to the axis $a$ of the beam of rays impinging upon the mirror $m_1$. The front end of the said cylinder, provided with a soft-iron cheek or end plate 9, is rigidly mounted on the carriage 3 by means of securing members 10.

(b) A pure nickel core 11, coaxial with the cylinder 8 and having its near end rigidly fixed to a soft-steel end plate 12 rigidly fixed to the rear end of the cylinder 8. The front end of the core 11 extends freely through an end plate 9 by way of an aperture 13 formed in the latter, and carries the support 7.

(c) A winding 14 disposed between the cylinder 8 and the core 11 is fed with particularly well stabilised direct current. For this purpose, the feed circuit of the said winding comprises a rectifier 15 connected to the supply system R and a stabiliser 16. A variable resistance 17 permits of varying the value of the feed current.

Thus, the magnetic field generated by the current circulating in the winding 14 produces a lengthening of the cylinder 8 and a contraction of the core 11. On the other hand, the heating due to this same current produces a lengthening of the cylinder and of the core. It will readily be appreciated that, owing to the method of mounting of the core 11 in the cylinder 8 and of this cylinder on the carriage 3, the expansions and contractions of the cylinder and of the core, due to magnetostriction, are additive, while the expansions of the cylinder and of the core due to the heating cancel each other out. Consequently, by simply varying the feed current of the winding 14 it is possible to produce displacements of the support 7 along the axis $a$, the amplitudes of which are as small as may be desired.

The apparatus also comprises a modulator MO producing a periodic variation of the length of the path followed by the beam of rays impinging upon the fixed mirror $m_2$.

This modulator comprises a glass wedge 18 supported by the pin 19 fast with flexible diaphragms 20 fixedly mounted on the frame 1. The said pin, which is disposed parallel to the plane of the mirror $m_2$, is caused to effect a periodic reciprocating movement by an electrodynamic device E, which comprises:

(a) A moving coil 21 carried by the pin 19 and fed with alternative current by the supply system R.

(b) A soft-steel casing 22 having a circular aperture 23 into which projects a core 24 supported by a permanent magnet 25 fixed to the casing. The coil 21 is freely arranged in the circular air-gap between the core 24 and the edge of the aperture 23.

It is clear that the periodic variations of the strength of the current flowing through the coil 21 cause similar variations in the strength of the magnetic field of the air-gap, thereby producing a periodic reciprocating movement of the glass wedge 18.

The installation described operates as follows:

When the source S is fed with direct current, the beam of parallel rays leaving the optical device O is divided by the semi-reflecting surface $c$ into two beams which impinge respectively upon the mirrors $m_1$ and $m_2$. The said beams are reflected by the said mirrors and combined by the semi-reflecting surface $c$ to form a beam of rays along the axis $y$, which is received by the photo-electric cell $b$.

If the mirrors $m_1$ and $m_2$ are absolutely plane, on the one hand, and absolutely parallel to the fronts of the incident waves on the other hand, a spreading out of the interference fringes to infinity is obtained, so that the illumination of the fields observed by an observer situated at the place of the cell $b$ is substantially uniform.

Under these conditions, assuming that the modulator MO is inoperative, a linear displacement of the mirror $m_1$ at constant speed produces a sinusoidal variation of the intensity of the illumination of the field observed and therefore of the luminous intensity received by the photo-electric cell $b$. This luminous intensity passes through a maximum when there is phase agreement on the semi-reflecting surface between the two beams of rays reflected by the mirrors $m_1$ and $m_2$ and through a minimum when there is phase opposition. The amplitude of the movement of the mirror $m_1$ necessary for changing from one maximum luminous intensity to the following maximum is obviously equal to half the wavelength of the monochromatic luminous source, since the length of the optical path followed by the reflected incident ray undergoes a variation equal to twice the movement of the mirror.

If now the movable mirror $m_1$ is adjusted to such a position along the slideway 2 that when the glass wedge 18 is in its middle position, i. e., the position midway from its two extreme positions, the luminous intensity received by the photo-electric cell $b$ is a maximum, and the modulator is then set in operation, a periodic variation of the luminous intensity received by the cell is obtained. By varying the feed voltage of the coil 21, the luminous intensity received by the cell may be reduced to a minimum for the two end positions of the wedge 18. Under these conditions, the successive intervals of time elapsing between two successive luminous intensity maxima are equal. Consequently, the electronic system II, which emits an electric impulse each time that the luminous intensity reaches a maximum, emits electrical impulses at regular intervals of time. Each electrical impulse emitted produces a reversal of the direction of flow of a direct-current through the measuring instrument $i$. Since the electrical impulses are emitted at regular intervals of time, the durations of flows of the current in one direction and the other through the measuring instrument are equal to one another. By reason of the inertia of this measuring instrument, which prevents it from following the reversals of the current, its moveable portion takes up a position of equilibrium which is a function of the ratio of the length of time of flow of the current in one direction and in the other Consequently, when these lengths of time are equal, this ratio is equal to unity, and the movable part remains in a zero position corresponding to the zero point of the scale of this instrument.

On the other hand, the smallest movement of the mirror $m_1$ from the position hereinbefore defined produces a displacement of the maximum of the luminous intensity received by the cell $b$, in relation to the periodic movement of the glass wedge 18.

Since the maximum luminous intensity is produced for a position of the glass wedge removed from its centre position, the successive times elapsing between the successive luminous intensity maxima in the course of a complete oscillation of the glass wedge 18 are unequal. Consequently, the electrical impulses are emitted at unequal intervals of time and the measuring instrument $i$ indicates the ratio of these successive intervals of time, which is a function of the movement of the mirror $m_1$. It is clear that in one form of construction of the apparatus described, the electronic device $d$ could emit an electrical impulse each time that the luminous intensity received by the cell $b$ periodically reached an extreme maximum or minimum value.

Tests carried out have shown that it is possible with the aid of the described apparatus to determine a maximum or minimum illumination and therefore an exact position of the mirror $m_1$ with a precision equal to 1/1000 and even 1/10000 of a fringe, provided that the light is absolutely monochromatic and that the optical surfaces are perfectly plane.

The replacement of one fringe by another in the course of the movement of the mirror $m_1$ can therefore be located with extremely high precision owing to the reappearance of electrical impulses emitted at regular intervals of time, that is to say, of identical or symmetrical situations. This regularity or symmetry may be utilised to actuate an electric meter C. The said meter then indicates the number of fringes (and therefore the number of half-wavelengths) which have succeeded one another between two defined positions of the mirror $m_1$.

The said meter is actuated by one unit each time that the impulses emitted by the electronic arrangement $d$ are equidistant in time. For this purpose, it is sufficient to superimpose on the electrical impulses emitted by the electronic arrangement $d$, electrical signals continuously emitted at regular intervals of time by an emitting device $f$ fed by the supply system R. Each time that the electrical impulses and the electrical signals coincide, they are added together and actuate the meter.

Under these conditions, the speed of movement of the mirror $m_1$ must be at most equal to the speed necessary to pass from one fringe to the following fringe in the course of one cycle of the feed current of the supply system R. For a fifty-cycle supply system, this speed is about $0.3\mu$ per 1/50 second, that is to say, 0.9 millimetre per minute.

The apparatus described may be employed in the following manner.

A standard rule is disposed parallel to the slideway 2 and the whole is arranged in an optical comparator of a known type at present in use in the main metrological laboratories. A length is marked off on the rule with the aid of the two microscopes of the said comparator, the said length being defined by the interval between two divisions. Without modifying the distance between the two microscopes, the said interval thus defined is transferred on to the axis of the movements of the mirror $m_1$. The said mirror $m_1$ is then centred, first under one microscope and then under the other. Fine adjusting movements are obtained by varying the resistance 17, which actuates the mirror $m_1$ under the effect of magnetostriction.

The mirror $m_1$ is moved by an exact whole number of wavelengths, which is possible either by counting them on the meter C or by approximate prior knowledge of the intervals between the lines on the rule, which is much simpler in practice. By reading the instrument $i$, it is possible to guarantee with very high precision that the movement has taken place through a whole, non-fractional number of wavelengths. Since there is necessarily some difference between the length of the rule and the nearest length measured on the interferometer in whole wavelengths, it is necessary that the microscopes effecting the comparison permit of reading this difference with a precise calibration. For this purpose, it is sufficient to have previously sighted a microscope on to the scale $r$ of the mirror $m_1$ and to have moved the mirror $m_1$ by a wavelength or a few wavelengths by magnetostrictive effect while simultaneously reading the correspondence between the measurements made on the instrument $i$ in wavelengths and in the microscope to be calibrated in divisions of its reticule or of its electronic indicator in the case of photo-electric microscopes.

One constructional form of apparatus has here been described by way of example with reference to the accompanying drawing, but it is clear that many modifications may be made therein. For example, the modulator could be disposed in the optical path of the beam of rays impinging upon the movable mirror $m_1$ and reflected thereby. The modulator could consist of one of the mirrors $m_1$ and $m_2$, actuated with a periodic reciprocating movement along an axis perpendicular to its plane, for example by means of the electro-dynamic device E or of a magnetostrictive device fed with alternating current. The amplitude of the movement of the mirror must then be equal to half the wavelength of the monochromatic light employed in order to produce a periodic variation of the length of the optical path equal to one wavelength.

Moreover, the modulator could consist of a rotatable plate having non-parallel surfaces or of a body, the refractive index of which is periodically changed by periodic variation of a physical factor, for example the pressure acting on the said body. To sum up, the modulator may consist of any device by means of which the optical path of a beam of rays may be periodically modified.

The measuring arrangement may comprise, on the one hand, a source of light fed by the momentary impulses emitted by the electronic arrangement $d$, and on the other hand by a stroboscopic device comprising a scale and rotatable reference marks permitting visible indication of the difference of the times elapsing between the flashes emitted by the luminous source. Such a measuring device has been described in U. S. Patent No. 2,401,712 and therefore need not be described in detail here.

The measuring arrangement may also comprise an oscillograph fed with the momentary impulses. Such an oscillograph may comprise a cathode-ray tube, the spot of which moves in synchronism with the modulating member and is influenced by the impulses emitted by the electronic device, as described in British Patent No. 684,435.

I claim:

1. An apparatus for precisely measuring lengths comprising an interferometer having a source of monochromatic light rays of constant luminous intensity, a semitransparent mirror separating said beam of rays into two perpendicular light beams of equal luminosity, a mirror located on the path of each of said two perpendicular light beams, said mirrors reflecting each light beam back along its own path to interfere one with the other, said mirrors spreading out to infinity the interference fringes in order to obtain substantially uniform illumination of the interference field, a modulator disposed in the optical path of one of said perpendicular beams, an actuating device driving said modulator for varying periodically the length of the optical path of one of said two perpendicular beams an amount at least equal to the wave length of said monochromatic light, and means for displacing the mirror reflecting the second of said two perpendicular light beams an amount equal to the length to be measured.

2. An apparatus as set forth in claim 1, and further comprising a support, a mirror of said interferometer and a scale carried by said support, said last mentioned means comprising a magnetostrictive device displacing said support along the axis of one of said two interfering beams of rays.

3. The apparatus of claim 2, and a photo-electric cell positioned to receive light from the field of said interferometer, said cell emitting an electric impulse when the luminous intensity of said field reaches an extreme value.

4. The apparatus of claim 3, and a counting meter connected to receive the impulses from said cell and to thereby register the number of fringes between two positions of said movable mirror.

5. The apparatus of claim 3, means to receive impulses from said cell to reverse the direction of the flow of the current, and a high inertia direct-current measuring instrument connected to said last mentioned means, said instrument indicating any difference in a first period of time occurring between first and second luminous intensities of said field and a second period of time occurring between second and third luminous intensities of said field.

References Cited in the file of this patent

UNITED STATES PATENTS

| | | |
|---|---|---|
| 1,455,795 | Logan | May 22, 1923 |
| 1,709,762 | Zworykin | Apr. 16, 1929 |
| 2,312,888 | Everest | Mar. 2, 1943 |
| 2,385,086 | D'Agostino et al. | Sept. 18, 1945 |
| 2,401,712 | Turrettini | June 4, 1946 |

FOREIGN PATENTS

| | | |
|---|---|---|
| 684,435 | Great Britain | Dec. 17, 1952 |